(12) United States Patent
Alberth, Jr. et al.

(10) Patent No.: US 8,957,551 B1
(45) Date of Patent: Feb. 17, 2015

(54) APPARATUSES AND METHODS FOR CONFIGURING A BUILDING AUTOMATION SYSTEM

(71) Applicant: Green Edge Technologies, Inc., Poway, CA (US)

(72) Inventors: William P. Alberth, Jr., Prairie Grove, IL (US); William D. Rice, San Diego, CA (US); Thomas A. Jung, San Diego, CA (US); Jin H. Lee, San Diego, CA (US)

(73) Assignee: Green Edge Technologies, Inc., Poway, CA (US)

( * ) Notice: Subject to any disclaimer, the term of this patent is extended or adjusted under 35 U.S.C. 154(b) by 0 days.

(21) Appl. No.: 14/163,477

(22) Filed: Jan. 24, 2014

(51) Int. Cl.
*H02J 9/00* (2006.01)
*H02H 11/00* (2006.01)

(52) U.S. Cl.
CPC .................................... *H02H 11/00* (2013.01)
USPC .......................................... 307/326; 307/116

(58) Field of Classification Search
USPC ......................................... 307/126, 326, 116
See application file for complete search history.

(56) References Cited

U.S. PATENT DOCUMENTS

| | | | |
|---|---|---|---|
| 5,760,558 A | 6/1998 | Popat | |
| 5,877,957 A | 3/1999 | Bennett | |
| 6,112,127 A | 8/2000 | Bennett | |
| 6,385,495 B1 | 5/2002 | Bennett | |
| 6,400,996 B1 | 6/2002 | Hoffberg et al. | |
| 6,418,424 B1 | 7/2002 | Hoffberg et al. | |
| 6,552,888 B2 * | 4/2003 | Weinberger | 361/57 |
| 6,912,429 B1 | 6/2005 | Bilger | |
| 7,336,192 B2 | 2/2008 | Aisa | |
| 7,339,466 B2 | 3/2008 | Mansfield et al. | |
| 7,406,353 B2 | 7/2008 | Bennett | |
| 7,480,746 B2 | 1/2009 | Simon et al. | |
| 7,813,831 B2 | 10/2010 | McCoy et al. | |
| 7,860,679 B2 | 12/2010 | Rouhier et al. | |
| 7,865,252 B2 | 1/2011 | Clayton | |
| 8,024,073 B2 | 9/2011 | Imes et al. | |
| 8,094,034 B2 | 1/2012 | Patel et al. | |
| 8,134,310 B2 | 3/2012 | Wacknov et al. | |

(Continued)

FOREIGN PATENT DOCUMENTS

EP 2 492 763 A1 8/2012
WO WO 2012/018526 A1 2/2012

OTHER PUBLICATIONS

"Human Current Sensitivities and Resistance Values in the Presence of Electrically Energized Objects", Peter E. Sutherland, Ph.D., P.E. et al., The Institute of Electrical and Electronics Engineers (IEEE), 2005, pp. 150-158.

*Primary Examiner* — Daniel Cavallari
(74) *Attorney, Agent, or Firm* — Bookoff McAndrews, PLLC

(57) ABSTRACT

An apparatus that is capable of detecting the presence of a plug comprising: a plurality of receptacles configured to receive a plurality of prongs from a plug, wherein the plurality of receptacles includes a first receptacle and a second receptacle; a controller configured to detect whether a first prong of the plurality of prongs is present in the first receptacle; and a switch configured to provide power to the second receptacle. The switch provides power to the second receptacle when the controller detects that the first prong of the plurality of prongs is present in the first receptacle and the switch does not provide power to the second receptacle when the controller does not detect that the first prong is present in the first receptacle.

20 Claims, 11 Drawing Sheets

(56) References Cited

U.S. PATENT DOCUMENTS

| | | |
|---|---|---|
| 8,183,995 B2 | 5/2012 | Wang et al. |
| 8,185,250 B2 | 5/2012 | Sato |
| 8,190,275 B2 | 5/2012 | Chang |
| 8,214,671 B2 | 7/2012 | Boss et al. |
| 8,234,363 B1 | 7/2012 | Kuo |
| 8,248,230 B2 | 8/2012 | Covaro et al. |
| 8,334,784 B2 | 12/2012 | Patel et al. |
| 2002/0035404 A1 | 3/2002 | Ficco et al. |
| 2002/0104745 A1 | 8/2002 | Allison |
| 2002/0149891 A1 | 10/2002 | Neiger et al. |
| 2002/0182907 A1 | 12/2002 | Katz |
| 2004/0138981 A1 | 7/2004 | Ehlers |
| 2005/0090915 A1 | 4/2005 | Geiwitz |
| 2006/0241880 A1 | 10/2006 | Forth et al. |
| 2007/0149013 A1 * | 6/2007 | Eastham et al. .............. 439/140 |
| 2008/0233777 A1 | 9/2008 | Burchell |
| 2009/0072985 A1 | 3/2009 | Patel et al. |
| 2009/0302026 A1 | 12/2009 | Shaw |
| 2010/0171430 A1 | 7/2010 | Seydoux |
| 2010/0188229 A1 | 7/2010 | Nhep |
| 2010/0280667 A1 | 11/2010 | Steinberg |
| 2010/0305773 A1 | 12/2010 | Cohen |
| 2011/0059637 A1 | 3/2011 | Macumber |
| 2011/0070756 A1 | 3/2011 | Peckham |
| 2011/0090042 A1 | 4/2011 | Leonard et al. |
| 2011/0313582 A1 | 12/2011 | Van Megen et al. |
| 2012/0270435 A1 | 10/2012 | Hale et al. |
| 2013/0030732 A1 | 1/2013 | Shetty et al. |

* cited by examiner

APPARATUSES AND METHODS FOR CONFIGURING A BUILDING AUTOMATION SYSTEM

FIELD OF THE INVENTION

Embodiments of the present disclosure are generally directed to apparatuses and methods for implementing a tamper resistant electrical outlet. More particularly, embodiments of the present disclosure are directed to apparatuses and methods for preventing an outlet from providing an electric shock to an individual inserting a foreign object into the outlet.

BACKGROUND OF THE INVENTION

Every year a number of children suffer electrical shock or fatal electrical shock from curiously inserting a metal object into an outlet. Several solutions have been implemented to provide tamper resistant operation to an outlet. Smart outlets will include microprocessors and the ability to better execute tamper resistant operation.

Thus, there is a need to enable safe and tamper resistant outlets for use in home and office.

SUMMARY OF THE INVENTION

The present disclosure is generally directed toward improving functionality of tamper resistant outlets. In one embodiment, an apparatus capable of detecting the presence of a plug is disclosed. In some embodiments, the apparatus may include a plurality of receptacles configured to receive a plurality of prongs from a plug, wherein the plurality of receptacles includes a first receptacle and a second receptacle; a controller configured to detect whether a first prong of the plurality of prongs is present in the first receptacle; and a switch configured to provide power to the second receptacle, wherein the switch provides power to the second receptacle when the controller detects that the first prong of the plurality of prongs is present in the first receptacle and the switch does not provide power to the second receptacle when the controller does not detect that the first prong is present in the first receptacle.

Various embodiments of the apparatus may include one or more of the following features: wherein the controller causes software to be executed, the software instructing the switch to provide power to the second receptacle when the controller detects that the first prong of the plurality of prongs is present in the first receptacle and the software instructing the switch to not provide power to the second receptacle when the controller does not detect that the first prong is present in the first receptacle; wherein the plurality of the receptacles includes a neutral receptacle and a hot receptacle; wherein the first receptacle is the neutral receptacle and the second receptacle is the hot receptacle; wherein the controller comprises a microprocessor and a passive network, wherein the passive network detects whether the first prong of the plurality of prongs is present in the first receptacle and provides a signal to the microprocessor when the passive network detects that the first prong is present in the first receptacle, and wherein the microprocessor instructs the switch to provide power to the second receptacle when the passive network provides the signal to the microprocessor, and the microprocessor does not instruct the switch to provide power to the second receptacle when the passive network does not provide the signal to the microprocessor; wherein the controller comprises a network, wherein the network detects at least one of a current, voltage, and power used by a device connected to the plug; wherein the controller comprises a microprocessor, wherein when the network detects the at least one of a current, voltage, and power used by a device connected to the plug, the network provides a signal related to the current, voltage, and power used by the device connected to the plug to the microprocessor, and wherein the microprocessor monitors the signal related to the at least one of a current, voltage, and power used by the device connected to the plug; wherein, when the controller detects that the first prong of the plurality of prongs is present in the first receptacle, the controller requests authorization to provide power to the second receptacle before the switch provides power to the second receptacle; wherein, when the controller requests authorization to provide power to the second receptacle, the controller awaits a response to the request for authorization before the switch provides power to the second receptacle; and wherein the request for authorization is sent to a device closest to the apparatus.

In another embodiment, a method of providing power to a receptacle of an outlet is disclosed. The method includes detecting whether a neutral prong of a plug is present in a first receptacle of an outlet; sending an authorization request to provide power to a second receptacle of the outlet when the detecting step detects that a neutral prong is present in the first receptacle of the outlet; receiving a response to the authorization request; and determining whether to provide power to the second receptacle of the outlet based on the response to the authorization request.

Various embodiments of the method may include one or more of the following features: providing power to the second receptacle of the outlet based on the determination in the determination step; wherein, when providing power to the second receptacle of the outlet, power is increased up to full power over a predetermined time period; wherein the predetermined time period is at least 2 seconds; wherein the step of sending the authorization request includes sending a request to an authorized user to request permission to provide power to another receptacle of the outlet; determining whether a load on the first receptacle of the outlet resembles a human, wherein when the load is determined to resemble a human, power to the second receptacle is disabled; sending a message when the load is determined to resemble a human; wherein the message sent is a second authorization request requesting to restore power to the second receptacle of the outlet; receiving a response to the second authorization request to restore power to the second receptacle of the outlet; determining whether to restore power to the second receptacle of the outlet based on the response to the second authorization request; and restoring power to the second receptacle of the outlet based on the determination in the second determination step.

It may be understood that both the foregoing general description and the following detailed description are exemplary and explanatory only, and are not restrictive of the disclosure, as claimed. The present invention will be more clearly understood from the detailed description below in conjunction with the accompanying drawings.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

DETAILED DESCRIPTION

Reference now will be made in detail to embodiments of the present disclosure, examples of which are illustrated in the accompanying drawings. Wherever possible, the same reference numbers will be used throughout the drawings to refer to the same or like parts and/or components.

Overview

An automation system, e.g., a home automation system, generally may include one or more switches and one or more outlets (or other suitable power delivery components), with the user desiring to control which outlet or outlets are controlled by each of the switch(es). Existing X10 devices require the user to manually set an address on the switch(es) and the outlet(s), wherein an outlet would respond to a switch with an identical address, e.g., the identically addressed switch may enable and/or disable power supplied by the outlet on command.

Embodiments of the present disclosure may include, among other things, an automation system. Examples of suitable systems include those described in U.S. Pat. No. 8,639,391, filed Nov. 8, 2012 and issued Jan. 28, 2014, the entire disclosure of which is incorporated by reference herein. Systems according to the present disclosure may be used in, e.g., residential, commercial, and/or industrial structures. Non-limiting examples include single-family and multi-family dwellings, condominium units, apartments, apartment buildings, hospitals, nursing homes, prisons, cruise ships, offices, office buildings, schools, churches, sporting complexes, shopping centers, and manufacturing facilities.

Figure 1:
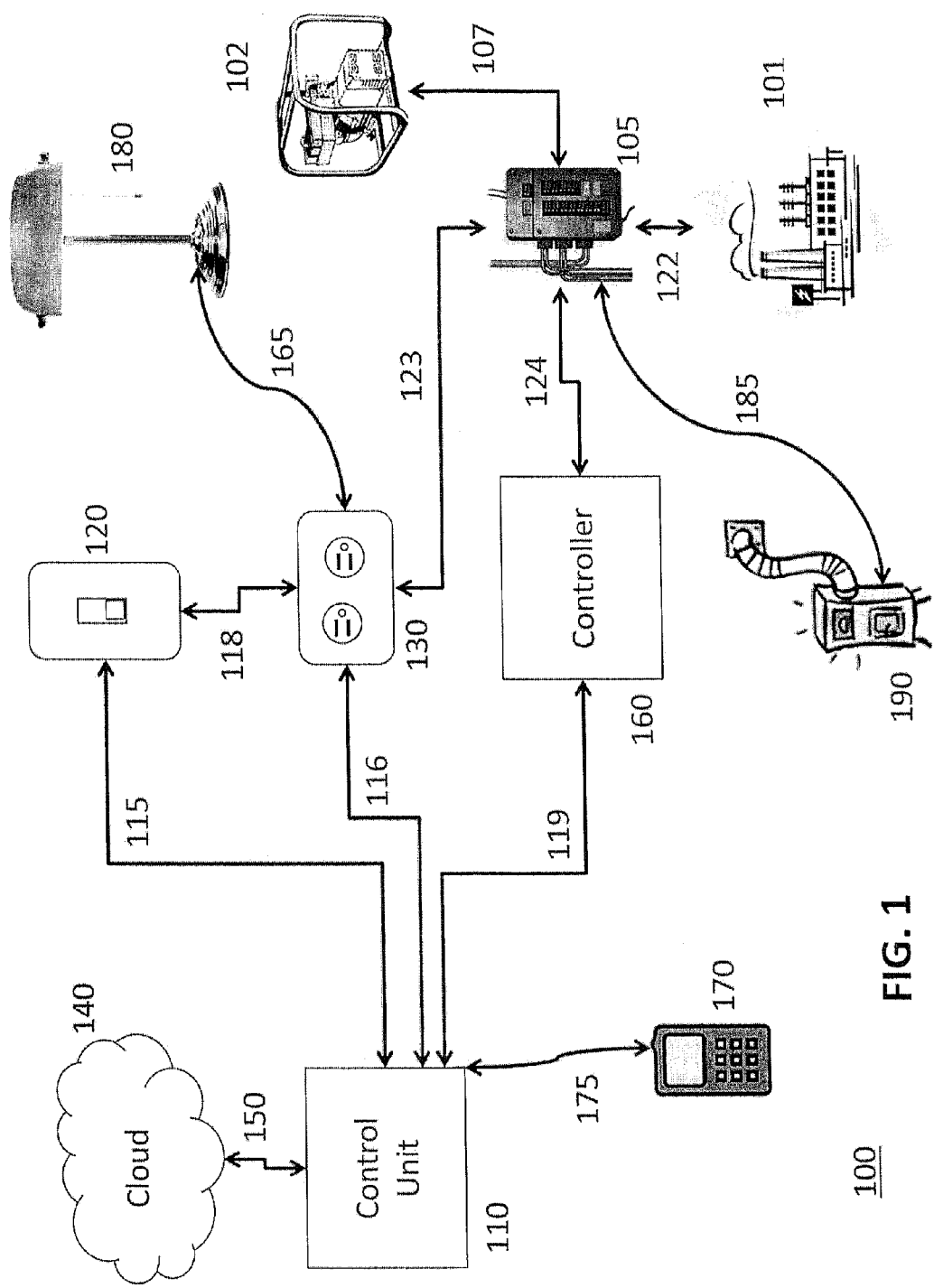
FIG. 1 schematically illustrates an exemplary building automation system, in accordance with an embodiment of the present disclosure.

Embodiments of the present disclosure may be further understood with reference to FIGS. 1-8. In FIG. 1, for example, a building automation system 100 includes at least one outlet 130, which may be locally and/or remotely controlled. In some embodiments the outlet may be a junction box controlling appliances. The outlet 130 may be configured to monitor the power consumed by one or more devices (e.g., electrical appliances or components) connected thereto and/or to control power delivered by the outlet 130. The system 100 may further include a switch 120, which may send a signal (e.g., a wired or a wireless signal) to a control unit 110. The control unit 110 also may be locally or remotely controlled and may include, for example, a computer with a microprocessor, memory, and user interface. The control unit 110 may include one or more of the following: a laptop, desktop, tablet, or any other suitable device. The control unit 110 may be connected via wired or wireless network connection 150 to the Internet or cloud 140, or any other electronic network. Cloud 140 may be any type of electronic network or combination of networks used for communicating digital content and data between various devices. Cloud 140 may include, for example, a local area network, a medium area network, or a wide area network, such as the Internet. The control unit 110 also may be connected to the switch 120 via a wired or wireless connection 115, and further connected to the outlet 130 via a wired or wireless connection 116. Similarly, the switch 120 may be connected to the outlet 130 via a wired or wireless connection 118.

The system 100 may include one or more other components or enhancements. Referring to FIG. 1, for example, the building automation system 100 may include a controller 160 that can control (e.g., adjust, open, or close) physical structures, such as, e.g., window coverings. Controller 160 may be also configured to control other systems or enhancements associated with a home, office, school, or other structure discussed herein. For example, controller 160 may control systems for irrigation, heating, cooling, entertainment, and/or water heating. In addition, controller 160 may control one or more safety systems. In some embodiments, the controller 160 may receive instructions from the control unit 110 via wired or wireless connection 119. For example, the controller 160 may receive instructions from the control unit 110 for controlling window treatments.

The switch 120 may also communicate with the controller 160, outlet 130, and/or one or more other components of building automation system 100 via wired or wireless means (not shown). The wired or wireless connections, for example, connections 115, 116, 118, and 119, may use the same or different protocols or standards. In some embodiments, switch 120 may communicate with outlet 130 through one or more devices of the building automation system 100. For example, switch 120 may communicate with a second outlet (not shown) or other component of the building automation system 100 through control unit 110, e.g., switch 120 may send a signal to control unit 110, and control unit 110 may send a signal to the second outlet. In some embodiments, switch 120 may send a signal to outlet 130, which may send a signal to the second outlet, thereby permitting communication between switch 120 and the second outlet. Other components of building automation system 100 may similarly relay and/or send messages on behalf of one component, e.g., a first component, to another component, e.g., a second component. This may be beneficial (in some cases required), such as if a direct communication path between the first and second components does not exist.

In addition to instructions being processed by control unit 110, some or all of the processing could be performed by one or more microprocessors included in the switch 120, the Internet or cloud 140, or the outlet 130. It is understood that the building automation system 100 may include multiple switches 120, outlets 130, and/or controllers 160, e.g., window control units. Other devices, such as sensors, may be in communication with the building automation system 100 to provide information, including, e.g., temperature, light intensity, etc. In some embodiments, for example, the system may include or otherwise be in communication with a moisture sensor for providing information on the presence of water, e.g., humidity, rain, snow, or other precipitation. Each outlet 130, switch 120, control unit 110, and controller 160 may include one or more features of the outlet, switch, control, and controller, respectively, described in U.S. Pat. No. 8,639,391, filed Nov. 8, 2012 and issued Jan. 28, 2014, which is incorporated herein by reference in its entirety.

A mobile device 170 may be wirelessly connected to the building automation system 100 via wireless connection 175. For example, the mobile device 170 may be connected to the control unit 110 as shown in FIG. 1, and/or may be connected to the outlet 130, controller 160, switch 120, another device in communication with the building automation system 100, or any combinations thereof. The mobile device 170 may include a wireless transceiver, which provides means to measure received signal strength. The mobile device 170 may include any suitable means of collecting, recording, analyzing, and/or transmitting data in order to locate, characterize, and/or otherwise identify one or more devices or components of the building automation system 100. In some embodiments, for example, the mobile device 170 may include a heat sensor and/or an RF sensor. Further, in some embodiments, the mobile device 170 may include an imaging device, e.g., a camera, for taking and transmitting pictures or other suitable images. The mobile device 170 may include means for determining location and/or orientation information. Non-limiting examples of such technology includes a global positioning system (GPS), accelerometers, compasses, and gyroscopes. The mobile device 170 may collect data to determine the orientation of the camera when taking a picture, e.g., whether the camera is pointed towards a ceiling, a floor, or a wall. The geographic location and cardinal direction of the camera may also be determined via a compass, GPS, accelerometer, and/or other suitable data collected by the mobile device 170 or one or more sensors coupled thereto. In addition to instructions being processed by control unit 110, some or all of the processing could be performed by mobile device 170. Suitable methods of collecting and processing such information are described in U.S. application Ser. No. 13/766,123, filed Feb. 13, 2013, which is incorporated herein by reference in its entirety. In at least one embodiment, mobile device 170 may include a smartphone, which may have a touchscreen. In a further embodiment, the mobile device 170 may be one or more smartphones, tablets, or other computer device utilized by, for example, a contractor during installation of the building automation system 100, e.g., during construction of the building.

Further referring to FIG. 1, electrical energy or power may be generated at power plant 101, and transmitted to a meter device or breaker box 105 via, for example, wired transmission lines 122. The methods presently disclosed also may be applied to other utilities and/or alternative energy sources, such as, e.g., water, natural gas, steam, heat, solar, wind, geothermal, algal, biomass, or any other utility or resource. Further, the term "utilities," as used herein, is contemplated to include other services including, but not limited to, Internet connections, data, voice, telecommunications, and/or broadcast services. Power may be routed to the outlet 130 by wires 123, and routed to controller 160 via wires 124. Power may be further routed to a heating ventilation and air conditioning (HVAC) system 190 via wire 185. It is also expected that power could be transmitted wirelessly and one or more of wires 122, 123, 124, and/or 185 could be replaced with wireless transmission methods. Each set of the wires, such as wires 123, may be referred to as a circuit. A circuit may be connected to and provide power to multiple devices, e.g., multiple outlets 130. In some embodiments of the present disclosure, the building automation system 100 includes one or more circuits, e.g., wires 123.

Breaker box 105 may measure voltage, current, and/or power on one or more power lines leading into and out of the breaker box 105. Breaker box 105 may, for example, include a utility meter. Breaker box 105 may be connected (e.g., wired or wirelessly) to the building automation system 100, and may include one or more sensors, such as voltage meters, current meters, temperature sensors, or other types of sensors. The one or more sensors may be connected (e.g., wired or wirelessly) to the building automation system 100.

An appliance 180, e.g., a desk lamp, may be plugged into or otherwise operably coupled to the outlet 130 or other suitable power delivery component through connection 165, which may be wired or wireless. The appliance 180 may be able to communicate with the building automation system 100 and/or another entity or component of building automation system 100 or coupled to the building automation system 100, and the appliance 180 may have the ability to measure the amount of power drawn from outlet 130.

Generator 102 also may be connected to breaker box 105 via wired connection 107. Generator 102 may be, for example, a backup generator, such as a natural gas or gasoline generator. Generator 102 may also use a flywheel, solar array, battery, or other method of storing or generating power. Generator 102 may be configured to start operating if, for example, the supply of power from power plant 101 is interrupted or is otherwise unable to supply sufficient power to one or more connected devices. In some implementations, upon detecting an interruption in the power supply from power plant 101, breaker box 105 may function to break the connection between transmission lines 122 and the connected devices through wires, such as wire 123 and wire 124, and instead, connect these devices to generator 102 through wires, such as wire 123 and wire 124.

Breaker box 105 may inform the building automation system 100 which power supply, e.g., generator 102 or power plant 101, is providing power to the building automation system 100. If generator 102 is determined to have relatively less capacity for providing power than power plant 101, then the building automation system 100 may be configured to reduce the number of devices that are drawing power so as to ensure that the capacity of either power supply is not exceeded. In an example, devices such as refrigerators or freezers are typically powered with a backup generator during a power outage so that food contained within these appliances does not spoil. Thus, the building automation system 100 may allow power to flow to a refrigerator or freezer by enabling power delivery to those outlets that such appliances are plugged into. Other devices such as the appliance 180 (e.g., desk lamp or other lighting device) may be prevented from drawing power by turning off the outlet (e.g., outlet 130), to which the appliance 180 is connected or plugged-in.

The building automation system 100 may be configured to enable HVAC system 190 and disable other devices, such as a refrigerator or freezer, while the HVAC system 190 is drawing power. In some embodiments, the building automation system 100 may be configured to monitor a device to ensure it is operating within, for example, a predetermined set of operating parameters or within a desired operational threshold. For example, the building automation system 100 may monitor the refrigerator or freezer to make sure the temperature inside the appliance does not exceed a predetermined threshold value. Typically, appliances such as refrigerators and freezers have thermal momentum, which allows the temperature inside such appliances to warm at relatively slow pace once the power supplies to these devices are turned off. Therefore, the building automation system 100 can be configured to monitor the internal temperatures of such appliances and allow other devices connected to the building automation system 100 to operate while the refrigerator and freezer slowly warm up but remain below a threshold temperature. The threshold temperature may be chosen such that the contents of the appliance are maintained at a desired temperature.

In some embodiments, the temperature outside the refrigerator or freezer may be monitored. The refrigerator or freezer can be expected to warm up at a rate related to the temperature difference outside to inside the device, time, and the insulation of the device. The building automation system 100 may measure the temperature inside the refrigerator, measure the temperature outside the refrigerator, turn the refrigerator off for a period of time such as 15 minutes, and then turn the refrigerator back on and measure any change in the internal temperature. If the temperature has not changed, the test may be repeated with a longer time such as 30 minutes or 1 hour, or longer. By measuring the temperature change the thermal constant of the refrigerator can be calculated. This would allow the building automation system 100 to determine how long the refrigerator can be turned off during without the refrigerator temperature rising above a threshold temperature determined safe for the contents. The thermal constant for the freezer and refrigerator sections may be separately measured and determined.

It is known that a refrigerator or freezer will warm more slowly if it is full of food or other material. The material stored has thermal resistance that will help hold a temperature if power is turned off to the refrigeration unit. The building automation system 100 may further track how much material is in the unit and use that information to help determine how long a refrigerator can be unpowered and stay below a threshold temperature.

The methods of keeping a refrigerator below a threshold temperature can be applied to an oven to keep an internal oven temperature above a threshold.

Figure 2:
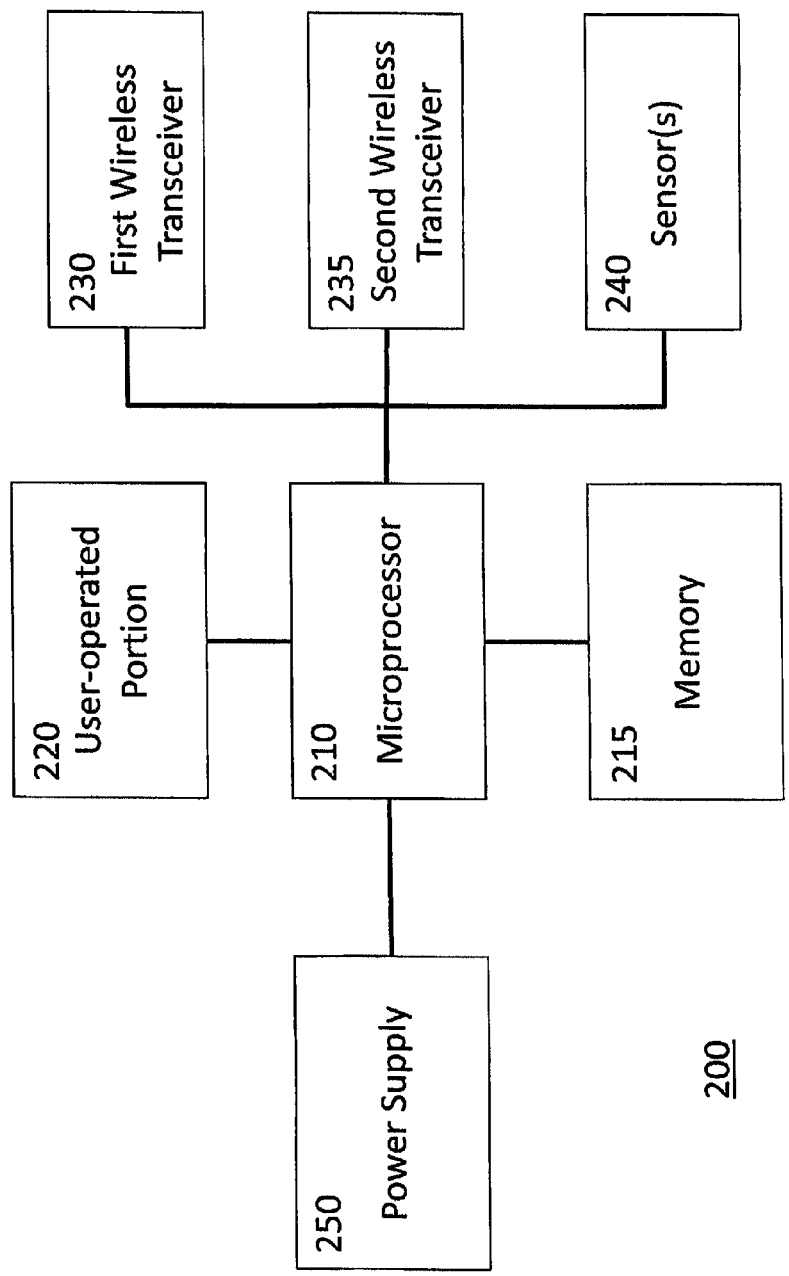
FIG. 2 schematically illustrates an exemplary switch for a building automation system, in accordance with an embodiment of the present disclosure.

FIG. 2 shows a block diagram for a switch 200 that may be used in the building automation system 100 and may operate as the switch 120 in FIG. 1. Switch 200 may be any suitable actuator known in the art. In at least some embodiments, the switch 200 may be remotely controlled. The switch 200 may include a microprocessor 210 capable of running software or an algorithm stored in memory 215. Memory 215 may be, e.g., solid state or flash memory, or any other suitable type of memory. The switch 200 may include a user-operated portion 220, such as a mechanical lever. In some embodiments, the switch 200 includes one or more user input devices, including, for example, a touch sensor, a touch screen, and/or push buttons. User-operated portion 220 may be configured to control (e.g., interrupt, adjust, change, terminate, and/or meter) the supply of energy to or from a device or an outlet (e.g., outlet 130 shown in FIG. 1) in communication with switch 200. In at least some embodiments, the user-operated portion 220 is configured to control the supply of electrical energy to a device or outlet 130. Accordingly, in one embodiment, the user-operated portion 220 may be configured to transition between an "on" position and an "off" position (i.e., supplying and terminating power, respectively). In another embodiment, the switch 200 may allow various levels to be controlled by the user discretely or continuously (e.g., increasing or decreasing power supply). That is, user-operated portion 220 may be configured to provide a dimming function or otherwise vary at least one of the voltage and the current of the electrical power supplied to outlet 130.

The switch 200 may further include a first wireless transceiver 230, for example, an 802.11 Wi-Fi transceiver. The term "transceiver" as used herein should not be construed as limited to any particular structural components. Instead, a transceiver may include any structural components configured to allow for back and forth communication, e.g., communication exchange. Accordingly, the transceivers disclosed herein may include, but are not limited to, antennae, power supplies, communication ports, and/or any other elements needed to achieve the desired function. The first wireless transceiver 230 may be configured to communicate over any known protocol including, but not limited to, X10, Zigbee®, and/or Bluetooth. Further, although the exemplary embodiment of FIG. 2 depicts the transceiver 230 as a wireless transceiver, those of ordinary skill will readily recognize that first wireless transceiver 230 may be replaced with a wired communication mode. First wireless transceiver 230 may allow the switch 200 to communicate with a control device, e.g., the control unit 110 as shown in FIG. 1. The first wireless transceiver 230 therefore may allow the switch 200 to exchange one or more commands with the control unit 110 of the building automation system 100.

In some embodiments, the switch 200 may also include a second wireless transceiver 235 to allow the switch 200 to communicate with one or more devices (e.g., the outlet 130 shown in FIG. 1 and/or any electrical load coupled thereto) using multiple standards. Both first wireless transceiver 230 and second wireless transceiver 235 may include received signal-strength indicator means to identify the strength of a signal received by the transceiver. The first wireless transceiver 230 and second wireless transceivers 235, respectively, may allow for communication over one or more protocols, including, but not limited to, the aforementioned protocols. In addition, the first wireless transceiver 230 may be configured to communicate over a protocol that is different from the communication protocol of the second wireless transceiver 235.

The switch 200 may include one or more sensors 240 configured to detect and/or respond to various conditions or stimuli, such as temperature, moisture (e.g., water, rain, or humidity), light, sound, air flow, contaminants, motion, and/or electromagnetic or radio frequencies. Examples of such one or more sensors 240 are disclosed in U.S. Pat. No. 8,639,391, filed Nov. 8, 2012 and issued Jan. 28, 2014, which is incorporated herein by reference. The one or more sensors 240 may include a camera, imager, and/or IR sensor. The one or more sensors 240 may be used to detect and/or identify persons, animals, and/or objects in the vicinity of the switch 200 and may be used to determine the identity of a person actuating the switch 200. Data from the one or more sensors 240 may be processed in the switch 200 and/or via another device coupled to the building automation system 100. The processing may include comparing the sensor data to sensor data stored locally or remotely in a database to determine an identity, such as the identity of the most likely person to be in the vicinity of the switch 200, or the most likely person to actuate the switch 200. The sensor may include an algorithm or other software to identify a person, e.g., via physical characteristics, such as facial recognition or fingerprint, or auditory characteristics, such as voice recognition, or may communicate with one or more other components of the building automation system 100 to identify a person through physical and/or auditory characteristics detected by the one or more sensors 240 of one or more switches 200 connected to the building automation system 100.

The sensor data may be sampled at a periodic or aperiodic rate, which may increase in response to stimuli (e.g., if one or more persons are in the vicinity of the switch 200) and decrease in the absence of stimuli (e.g., when persons are not in the vicinity of the switch 200). The one or more sensors 240 may sample, e.g., collect, store, and/or display, data upon actuation of the switch 200.

One or more transceivers (e.g., first wireless transceiver 230 and/or second wireless transceiver 235) may communicate with a device associated with (e.g., carried by) a person, such as a mobile device 170, e.g., a smartphone. By communicating with mobile device 170 and/or by monitoring a signal emitted from mobile device 170, switch 200 may determine that mobile device 170 is near the switch 200. This may be determined by any suitable means, such as, e.g., by measuring the strength of the signal emitted by mobile device 170, by measuring the time delay of a message to or from mobile device 170, or by other means known in the art. One or more components of building automation system 100 may recognize an association between mobile device 170 and one or more persons, for example, and thereby building automation system 100 may associate mobile device 170 with a particular person or operator. If switch 200 detects that mobile device 170 is in the vicinity of the switch 200, then building automation system 100 may determine or otherwise understand that the owner or operator of mobile device 170 is also in the vicinity of switch 200.

The switch 200 may include a power supply 250, which may be any suitable power supply known in the art. In some embodiments, for example, the power supply 250 includes a battery, e.g., a rechargeable battery. It is understood that the power supply 250 in FIG. 2 may schematically illustrate a wired or wireless connection to a power network, such as, e.g., a power grid or transformer. Further, the power supply 250 may include both a battery and a connection to a power network. If the power supply 250 includes a connection to a power network and a battery, the battery may provide backup power to the switch 200 when the power from the power network is disconnected. Further, when power from the power network is connected, power from the power network may charge the battery of power supply 250. The one or more sensors 240 may allow at least one of the voltage and current to be measured at connection 350 of outlet 300 (discussed below) or at the switch 200. When the one or more sensors 240 measure the at least one of the voltage and current at outlet 300 and/or switch 200, the switch 200 may determine whether power from the power network is connected or disconnected, and thus, determine whether to power the outlet 300 and/or switch 200 from one or both of the battery and the power network.

Figure 3:
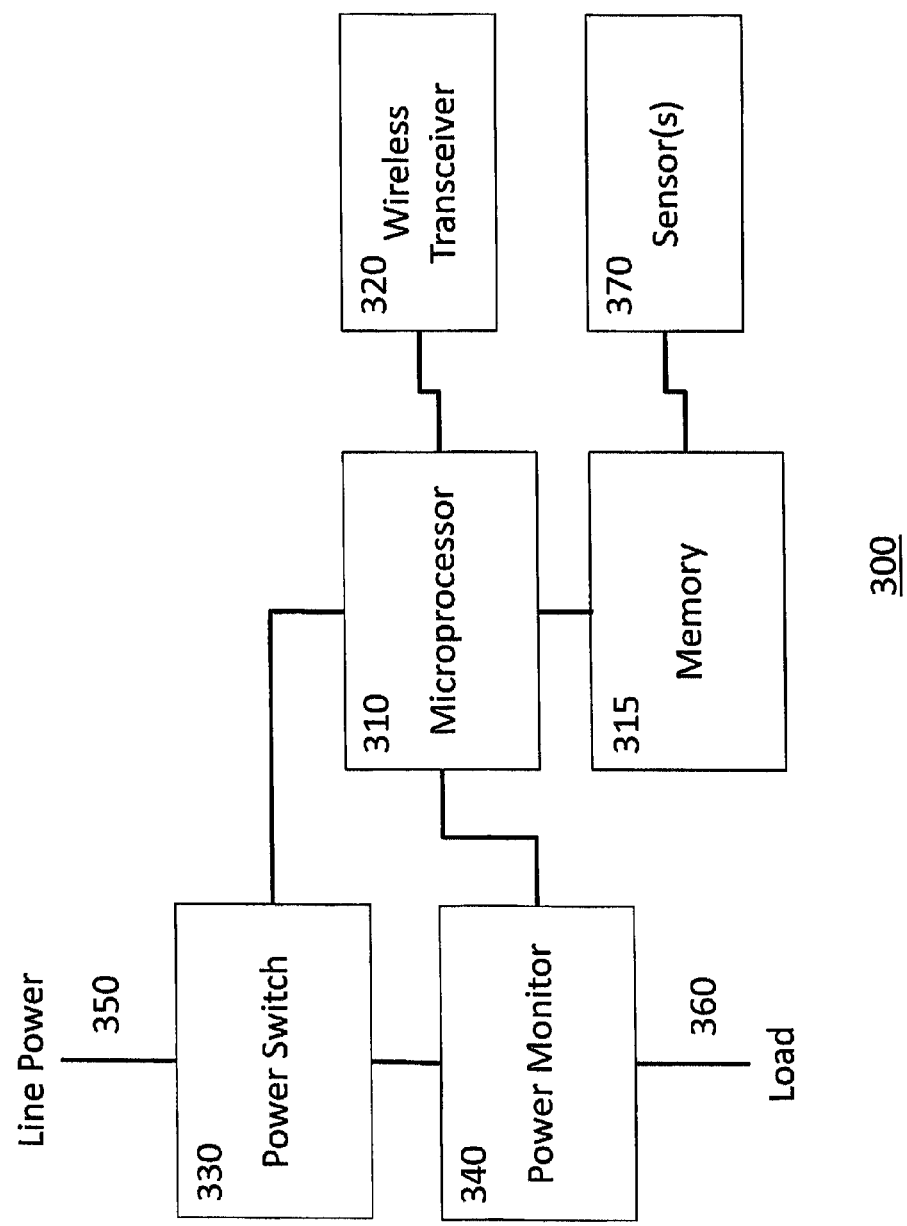
FIG. 3 schematically illustrates an exemplary outlet for a building automation system, in accordance with an embodiment of the present disclosure.

The switch 200 may include a microprocessor 210, which may be any suitable microprocessor known in the art. Although FIG. 2 shows the microprocessor 210 located within the switch 200, in some embodiments the microprocessor 210 may be remotely connected to the switch 200. The microprocessor 210 may be configured to communicate, e.g., exchange control signals, with the one or more sensors 240, the first wireless transceiver 230, the second wireless transceiver 235, and/or the user-operated portion 220 of switch 200, FIG. 3 shows a block diagram of an outlet 300 that may operate as the outlet 130 of the building automation system 100 shown in FIG. 1. In at least some embodiments, the outlet 300 is remotely controlled. The outlet 300 may include a microprocessor 310 that runs software or an algorithm stored in memory 315. The microprocessor may be remotely connected to outlet 300. The outlet 300 further may include a transceiver 320, which may include any of the features described in connection with first wireless transceiver 230 and the second wireless transceiver 235 of FIG. 2. The outlet 300 also may include one or more sensors 370, which can include, e.g., motion sensors, voltage sensors, current meters, ambient light sensors, cameras, microphones, moisture sensors, or any of the sensors described above with respect to the one or more sensors 240 of FIG. 2. The one or more sensors 370 may allow at least one of the voltage and current to be measured at connection 350 with a source of electrical energy.

In some embodiments, the outlet 300 receives electrical energy via a power switch 330 supplied by line power via connection 350. The power switch 330 may be controlled by a microprocessor, e.g., microprocessor 310, which may include any of the features described with respect to the microprocessor 210 of FIG. 2. The power switch 330 may be configured to connect and/or disconnect the line power to the outlet 300, including a connected load 360 (e.g., one or more electrical devices coupled to the outlet 300). The power switch 330 also may be configured to vary (e.g., increase, reduce, or otherwise control) a voltage or current delivered to the load 360, thus providing a dimming function. The outlet 300 may have a connection to line power, a battery, e.g., a rechargeable battery, and/or the battery of switch 200, The battery of the outlet 300 and/or switch 200 may provide backup power to the switch 200 and/or outlet 300 when the power from the power network is disconnected. Further, when power from the power network is connected, power from the power network may charge the battery of switch 200 and/or outlet 300. The one or more sensors 240 and/or the one or more sensors 370 may allow at least one of the voltage and current to be measured at connection 350 of outlet 300 (discussed below) or at the switch 200. When the one or more sensors 240 and/or the one or more sensors 370 measure the at least one of the voltage and current at outlet 300 and/or switch 200, the switch 200 and/or outlet 300 may determine whether power from the power network is connected or disconnected, and thus, determine whether to power the outlet 300 and/or switch 200 from one or both of the batteries and/or the power network.

The outlet 300 may further include a power monitor 340 for measuring the consumption of power by the load 360 connected to the outlet 300. The power monitor 340 may measure voltage and/or may measure current of the electrical energy delivered to the load 360, and this may include for example, measuring average values, RMS values, or sampling the waveform of the measured characteristic. The load 360 may be connected via any suitable means, such as, e.g., standard 2 or 3 pin power outlets, 220V outlets, or international standard outlets, and may also include a wireless connection such as via a wireless charger. The power meter/monitor 340 may transmit measured power data to the microprocessor 310 via the wireless transceiver 320, or may also transmit data to one or more other components or devices of the building automation system 100.

In some embodiments, the power monitor 340 measures noise in the connection to the load 360 in order to determine the type of energy-consuming device(s) connected to outlet 300. See, e.g., U.S. Pat. No. 8,639,391, which is incorporated herein by reference. This type of analysis is discussed, for example, in U.S. Pat. No. 8,094,034. Multiple connections throughout an entire structure may be monitored and analyzed to determine the types of devices, such as appliances, connected to define the load 360, e.g., by turning the devices on and off. In some embodiments, user activity may be inferred by monitoring a structure, e.g., identifying which loads are activated and deactivated. By monitoring power consumption characteristics of the load 360, one or more characteristics of a device connected to the outlet 300 may be determined, e.g., via techniques disclosed in U.S. Pat. No. 8,094,034 or other suitable analytical methods. Based on the power consumption characteristic(s), the device (e.g., an oven, refrigerator, fan, or other appliance) may be beneficially and intelligently identified and controlled.

In some embodiments, the outlet 300 may be connected to an appliance at 360 (i.e., an appliance as the load 360). The appliance may have a power switch similar to power switch 330 of the outlet 300 to turn the appliance on or off and/or to place the appliance in an intermediate state, such as dimming, standby, or another state of reduced energy consumption. The appliance power switch and/or the power switch 330 of outlet 300 may control power to the appliance, e.g., supply and/or terminate or disable power to the appliance. In one embodiment the power switch 330 may be composed of a relay and a TRIAC (Triode for Alternating Current) configured generally in parallel. The TRIAC may be used to provide a dimming function, by reducing the power provided to an appliance. The relay may also be used to provide power to an appliance or device connected to 360.

In some embodiments, the outlet 300 may monitor the state of the appliance to determine if the appliance power switch has been actuated. One method of determining actuation of the appliance power switch is to measure the resistance of the appliance, i.e., the resistance of the load 360 connected to the outlet 300. For example, a relatively small amount of electrical current or voltage may be supplied to the appliance, and resistance may be measured, e.g., with an ohmmeter or other suitable device. If the appliance power switch is set to turn the appliance on, the appliance may present a relatively low impedance to the supplied current/voltage, whereas if the power switch is set to turn the appliance off, the appliance may present a relatively high impedance. By measuring the impedance of the load 360, the outlet 300 may determine the state of the appliance power switch and determine if the state of the switch has changed.

The outlet 300 may have electrical and/or mechanical capability of determining whether a plug is connected to a socket of the outlet 300. For example, the outlet 300 may include an electrical sensor and/or mechanical mechanism for detecting a connection or otherwise detecting the presence of a plug within or otherwise coupled to outlet 300. Such sensors may include, but are not limited to, proximity sensors, mechanical switches, imagers, cameras, etc. Further, the outlet 300 may include an RF sensor for detecting an RF signal emitted by a plug, e.g., if the plug is sufficiently close to the outlet 300. Other suitable means of detecting and/or identifying whether an appliance or other device is connected to the outlet 300 will be known to those of ordinary skill in the art.

In some embodiments, the outlet may send a message to building automation system 100 if an appliance is unplugged from the outlet or otherwise not drawing power. The building automation system may send a notification to an authorized user or another authority if certain appliances are unplugged. This would be useful if, for example, a robbery is in process and the thief unplugs a television or stereo. The home automation system may use this information to assist in determining that a robbery is taking place. The authorized user may chose which appliances should be monitored for unplugging, and this information may be sent by a component of the home automation system to at least one outlet or other device of the home automation system. The outlet may include software that determines whether or not to notify the system of an unplugged appliance based on the identity of the appliance determined by the outlet, home automation system 100, or defined by an authorized user. A component of home automation system 100 may keep a record of appliances that are plugged and unplugged into devices connected to home automation system 100. In embodiments where the system 100 monitors whether an appliance ceases to draw power, those embodiments may be useful to determine whether a malfunction has occurred in the appliance.

If the outlet 300 recognizes or detects a connection, e.g., determines that a plug is connected to the socket of outlet 300 or detects a wireless connection to an appliance, the outlet 300 may monitor the state or condition of the appliance, e.g., whether the appliance is turned on or turned off. In some embodiments, for example, the outlet 300 may monitor the appliance continuously for a change in state.

In some embodiments, the outlet 300 may monitor whether an appliance operably coupled to outlet 300 is turned on, turned off, or placed in an intermediate state when a person is determined to be in the vicinity of the appliance. For example, the one or more sensors 370 of outlet 300 may include a sensor that may determine that a person is in a given area or radius of the appliance. Alternatively, or in addition, a sensor otherwise connected to the building automation system 100 such as one or more sensors 240 may determine that a person is in the area of the appliance. For example, a person may be in the same room as the appliance, in the same house or structure as the appliance, or within a certain predetermined distance of the appliance, such as, for example, from about 1-10 feet or within about 3 feet or about 5 feet. The presence of a person may be determined by any suitable method, including, but not limited to, a motion sensor, a camera, or the presence of a mobile device, e.g., mobile device 170. In some embodiments, for example, the building automation system 100 may determine the presence or identity of a person by determining the location of a mobile device 170. In other embodiments, the building automation system 100 may detect the presence of a person by detecting one or more other components of the building automation system 100 being turned on, turned off, or otherwise adjusted in a given area. For example, the building automation system 100 may detect a light being turned on and determine that a person is near the light. If no one is detected within the vicinity of the appliance, the outlet 300 may not conduct any monitoring, or may monitor the appliance more or less frequently, periodically, or continuously depending on various desired needs of a person using of the building automation system 100.

In some embodiments, the building automation system 100 may send instructions to one or more components of the building automation system 100 to detect and/or identify a person. For example, if a switch 200 is known to be near outlet 300 and/or another device of the building automation system 100, and if any of the devices detect the presence of a person, the building automation system 100 may send instructions via switch 200 to one or more devices in the vicinity, e.g., all devices in the vicinity of the person may attempt to detect and identify the person. In some embodiments, building automation system 100 may send instructions directly to one or more devices in the vicinity of the person to detect and identify the person.

In some embodiments, for example, the outlet 300 may periodically check if a power switch on the appliance has been actuated. For example, the outlet 300 may monitor the appliance every 5 minutes, 10 minutes, 15 minutes, 30 minutes, 1 hour, 2 hours, 6 hours, 12 hours, 24 hours, or at any suitable interval, for a change in state. The periodicity may be adjusted depending on the time of day, the presence of a person, motions or other activity of a person, and/or other inputs to the building automation system 100. For example, an outlet 300 may have an appliance plugged in, wherein initially power is not supplied to the appliance. When the appliance is switched on, the outlet 300 may monitor the state of the appliance continuously, or the outlet 300 may monitor the state of the appliance periodically, such as every 5 minutes. If a person is determined to be in the vicinity of the appliance and not moving, the outlet 300 may, for example, monitor the appliance every 5, 10, 15, 20, 25, 30, 45, or 60 seconds. If the person in the vicinity of the appliance is moving, however, the outlet 300 may monitor the appliance more frequently, such as every 1 second.

If the outlet 300 does not determine that an appliance or other device is connected, e.g., plugged into the socket or otherwise connected wirelessly, the outlet 300 may not conduct any monitoring. The outlet 300 may periodically check to determine whether an appliance is connected, e.g., electrically and/or mechanically, as discussed above.

The outlet 300 may comprise a device that is included in a junction box or coupled to an electrical system, e.g., to provide power to another utility or device. By way of example, this could be a device included in a ceiling junction box that is coupled (e.g., wired) to, e.g., a ceiling fan, a device included inline to power outside flood lights, a device that monitors and/or controls the flow of natural gas to a furnace, among other variations.

In further embodiments, outlet 300 may be configured to selectively control the electrical energy delivered to a load 360 coupled thereto. That is, outlet 300 may be configured to vary the current or voltage delivered to a load 360. In order to perform such variations, or provide a dimming function, outlet 300 may include one or more TRIACS and relays in a circuit, e.g., parallel. As those of ordinary skill in the art will understand, the TRIAC may be provided to facilitate the dimming function, by, e.g., varying voltage, while the relay may facilitate routine on/off functionality.

Figure 4A:
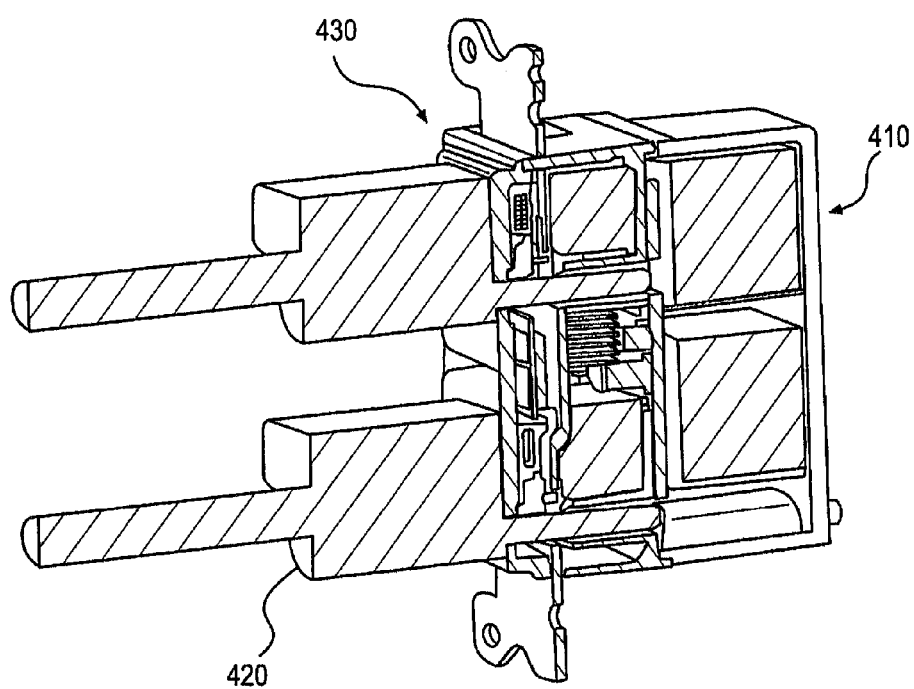
FIG. 4A depicts a cutaway drawing of an exemplary outlet with a plug inserted in the receptacle.

Turning now to FIG. 4A, a cutaway drawing of an exemplary outlet 410 with a plug 420 inserted in receptacles of the outlet 410 is depicted. The outlet 410 may operate as the outlet 130 of the building automation system 100 shown in FIG. 1 or as the outlet 300 as shown in FIG. 3. The outlet 410 includes an outlet housing that may include one or more of the above-described components of outlet 300. Those of ordinary skill will recognize that some of the components described above in connection with outlet 300 may be disposed outside of the housing depicted in FIG. 4A, but operably coupled to the outlet 410. As can be seen in FIG. 4A, a plug 420 of an appliance, such as appliance 180 as discussed above, is inserted into the receptacles of the outlet 410. Plugs comprise a plurality of prongs. As known by a person of ordinary skill in the art, plugs generally include at least two prongs, e.g., a hot prong and a neutral prong. Plugs may also include a grounding prong. In an embodiment of the present disclosure, it is assumed that plugs comprise at least one hot prong and at least one neutral prong. However, it is readily apparent to a person of ordinary skill in the art that a plug with other prong configurations can be used. Corresponding outlets for a plug comprise a plurality of receptacles that receive the plurality of prongs, e.g., a hot receptacle and a neutral receptacle.

As shown in FIG. 4A, when the plug 420 is inserted into outlet 410, the neutral prong 430 of plug 420 is disposed in a neutral receptacle of outlet 410. Within the neutral receptacle of outlet 410, the neutral prong 430 comes in contact with one or more contacts. As discussed in more depth below, the one or more contacts may be directly or indirectly connected to a microprocessor within the housing of the outlet 410, or the one or more contacts may be connected directly or indirectly to one or more control circuits. One of ordinary skill will recognize that some of the components, such as the microprocessor or one or more control circuits, described above in connection with outlet 300 may be disposed outside of the housing depicted in FIG. 4A, but operably coupled to the outlet 410 The one or more contacts also may be connected to neutral or a system ground.

Figure 4B:
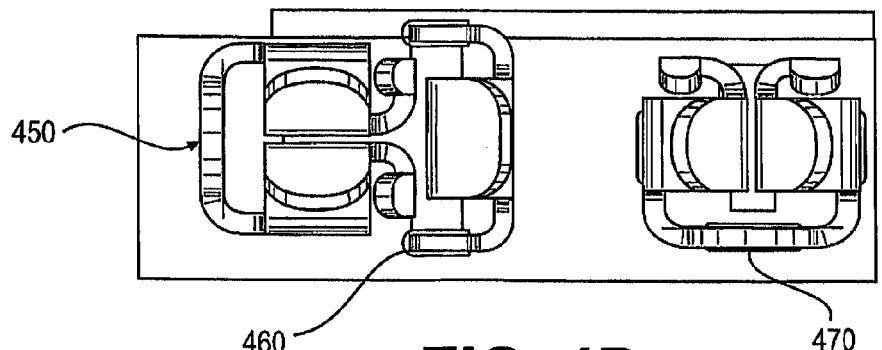
FIG. 4B depicts neutral contacts and a hot contact of an exemplary receptacle of an outlet.
Figure 4C:
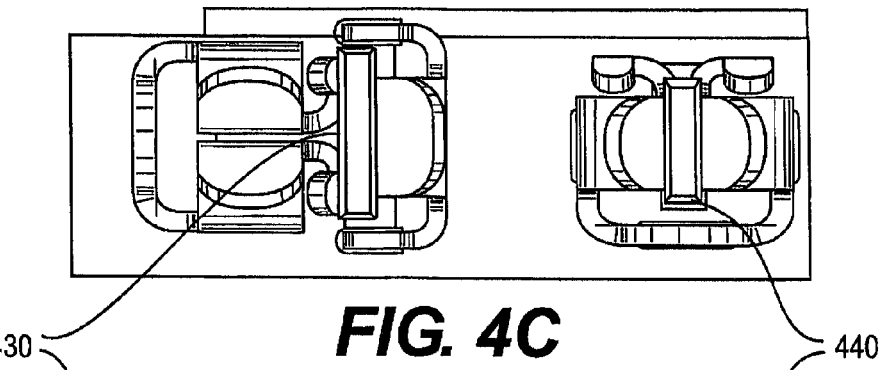
FIG. 4C depicts neutral contacts and a hot contact of an exemplary receptacle of an outlet with a plug inserted in the receptacle.
Figure 4D:
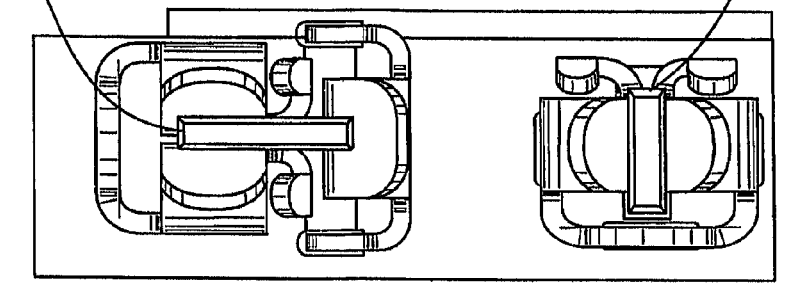
FIG. 4D depicts neutral contacts and a hot contact of an exemplary receptacle of an outlet with a plug inserted in the receptacle.

FIG. 4B shows an example of the one or more contacts inside the receptacles of outlet 410. Neutral contact 450 and neutral contact 460 come into connection with neutral prong 430, as seen in FIGS. 4C and 4D. Hot contact 470 comes into connection with a hot prong 440. Neutral contact 460 may be the first contact 542 (FIG. 5) and neutral contact 450 may be the second contact 544 (FIG. 5), as discussed below, or neutral contact 450 and neutral contact 460 could be in an opposite configuration. Neutral contact 450 and neutral contact 460 are designed in a way to ensure that contact would work with different types of plugs. For example, FIG. 4C shows the neutral prong 430 and hot prong 440 in a configuration of a 15 Amp plug, and shows that both neutral contact 450 and neutral contact 460 contact neutral prong 430 and hot contact 470 contacts hot prong 440. FIG. 4D shows an example where the neutral prong 430 and hot prong 440 in a configuration of a 20 Amp plug. Also shown in FIG. 4D is neutral contact 450 and neutral contact 460 contact neutral prong 430 and hot contact 470 contacts hot prong 440.

Figure 4E:
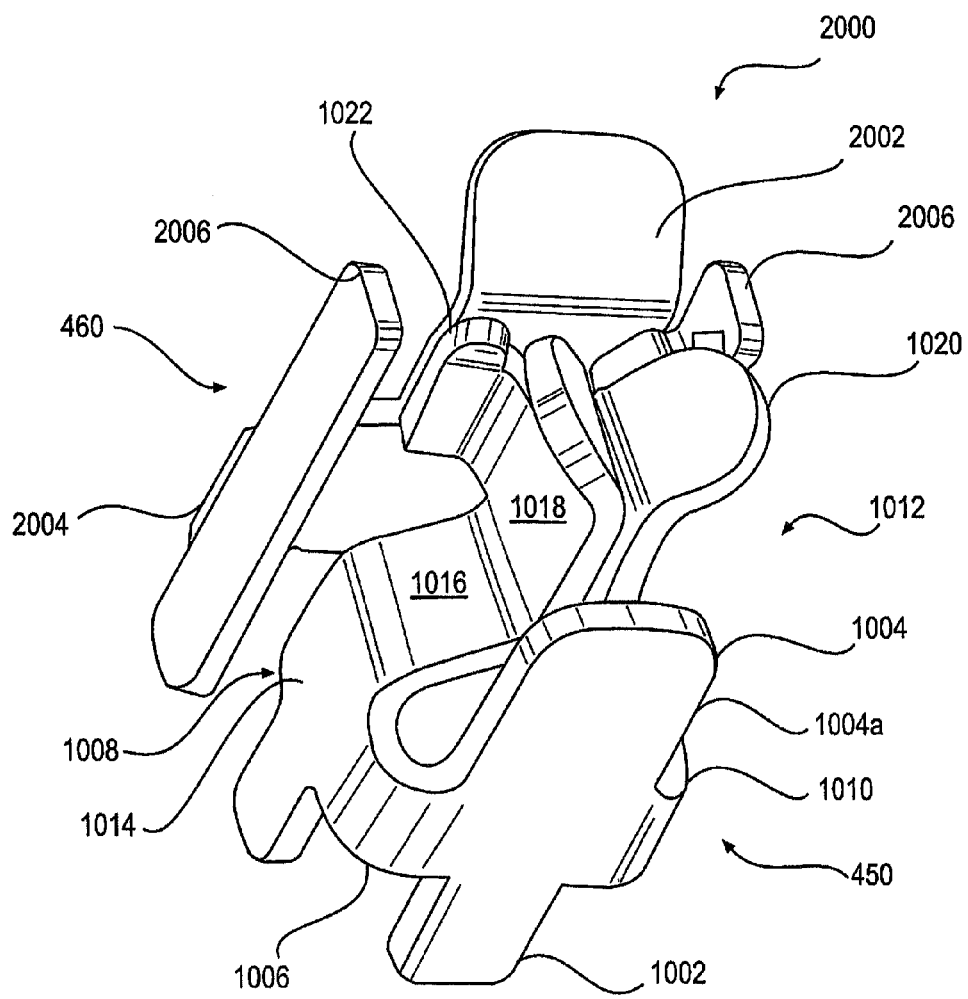
FIG. 4E a perspective view of neutral contacts of an exemplary receptacle of an outlet.
Figure 4F:
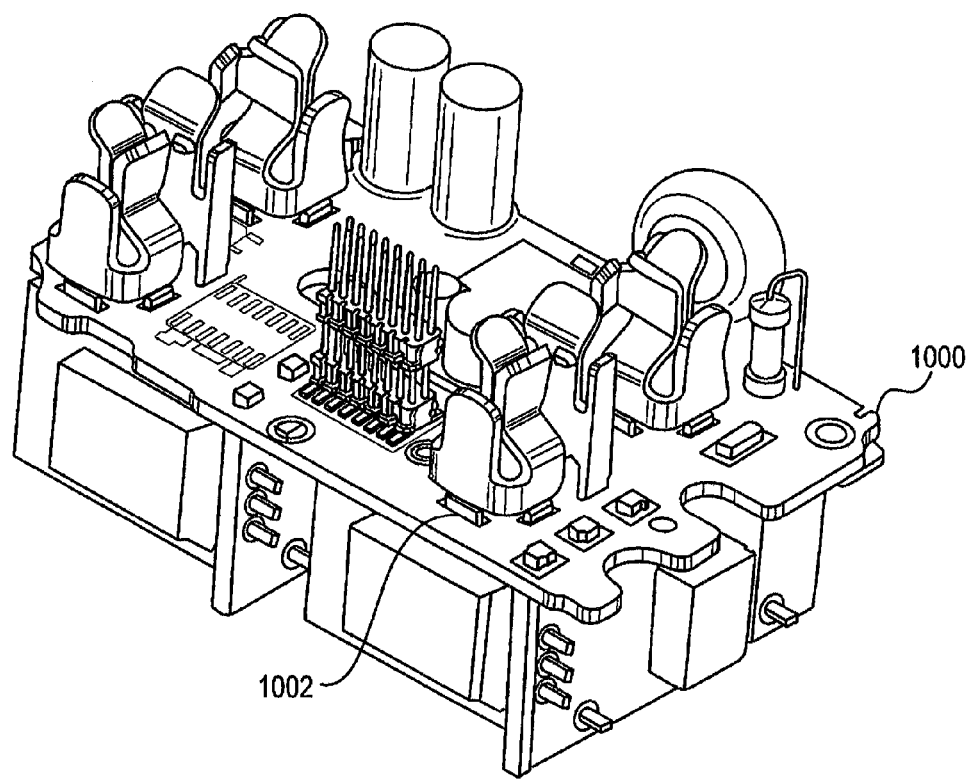
FIG. 4F depicts a cutaway drawing of an exemplary receptacle of an outlet.

With specific reference now to FIGS. 4E and 4F, the structural features and geometries of contacts 450, 460, and 470 will be discussed. Contact 450 may be substantially similar to contact 470. Thus, for the purposes of efficiency, only the structural features of contacts 450 and 460 will be discussed herein. Those of ordinary skill in the art will recognize that contacts 450, 460, and 470 may be disposed on a printed circuit board ("PCB") 1000 in any suitable configuration. Contacts 450, 460, and 470 may secured to via any suitable means known in the art. In one embodiment, each of contacts 450, 460, and 470 may include a plurality of legs 1002 configured to be received in respective through-holes in PCB 1000. The legs 1002 may have a length that is sufficient to allow them to be inserted through the PCB and bent on an opposing side of PCB 1000, so as to secure contacts 450, 460, and 470 to PCB 1000. In addition, or alternatively, contacts 450, 460, and 470 may be welded or soldered to PCB 1000.

Contacts 450, 460, 470 may be made of any suitable conductive materials, including, but not limited to, gold and copper. In addition, contacts 450, 460, and 470 may be fabricated from a one-piece construction. For example, each of contacts 450 may be stamped or cut from a single sheet of metal and folded or bent into the configurations depicted in FIGS. 4B-4E. Those of ordinary skill in the art will understand that contacts 450, 460, and 470 may be of a resilient material, so that first and second lateral walls 1008, 1012 (discussed below) may flex relative to their respective legs 1002 to accept a prong 430 therebetween.

In its finally assembled configuration, contact 450 may include a first wall 1004 configured to extend away from PCB 1000. Wall 1004 may include a substantially outer surface 1004a and a substantially planar inner surface (not shown) disposed opposite surface 1004a. Wall 1004 may extend away from a leg 1002. In some embodiments, the edges of wall 1004 may be rounded. Wall 1004 may be connected to a first lateral wall 1008 by a first connection 1006. Connection 1006 may extend away from a side wall portion of wall 1004 and may curve away from outer surface 1004a. Connection 1006 may be integral with wall 1004 and first lateral wall 1008. Further, wall 1004 may be connected to a second lateral wall 1012 by a second connection 1010.

First lateral wall 1008 and second lateral wall 1012 also may include legs 1002, as explained above. First and second lateral walls 1008, 1012 may be mirror images of one another. Thus, for the purposes of efficiency, only first lateral wall 1008 will be discussed. First lateral wall 1008 may include a first portion 1014 disposed in the same plane as the leg corresponding to first lateral wall 1008. Extending from first portion 1014 may be a second portion 1016, which may be bent or otherwise configured to extend toward second lateral wall 1012. As shown in, e.g., FIG. 4D, second portions 1016 of first and second lateral walls 1008, 1012 may extend toward one another up until approximately a centerline, or just prior the centerline, of wall of 1004. As shown in FIG. 4E, second portion 1016 may extend from first portion 1014 at an angle of approximately 30 degrees. A third portion 1018 may extend from second portion 1016 in substantially the same direction of first portion 1014. Finally, a flared-portion 1020 may extend from third portion 1018 in a direction away from second lateral wall 1012 and at an angle of approximately 45 degrees. Flared-portion 1020 may function as a guide to assist guiding a prong, e.g., prong 430, into the space defined in between first and second lateral walls 1008 and 1012, as shown in FIG. 4D. Extending from the side of third portion 1018 that is farthest from wall 1004 may be a vertical flared-portion 1022. Vertical-flared portion 1022 may extend away from third portion 1018 and also may curve away from second lateral wall 1012.

In some embodiments, contact 460 may be electrically isolated from contact 450. Contact 460 may include a substantially planar central wall 2000, which may include a corresponding leg 1002. An upper portion of central wall 2000 may include a flared-back portion 2002, as shown in FIG. 4E. As shown in FIG. 4B, central wall 2000 may be disposed adjacent vertical flared-portion 1022 of contact 450. Extending from central wall 2000 may be curved connecting walls 2004. Each connecting wall 2004 may lead to a side wall 2006. Side walls 2006 may be substantially planar, may include corresponding legs 1002, and may include planar surface disposed generally orthogonally to central planar wall 2000.

As alluded to above, when a neutral prong 430 is inserted into a 15 Amp outlet, the prong 430 touches contacts 450, 460 by making contact with a substantial portion of central wall 2000 and the respective vertical flared-portions of first and second lateral walls 1008, 1012. Alternatively, when a neutral prong 430 is inserted into a 20 Amp outlet, the prong touches contacts 450, 460 by making contact with portions of first and second lateral walls 1008, 1012, and central wall 2000. The contact assign enables reception of a 20 A or a 15 A plug.

When a plug is inserted into an outlet, the circuitry connected to the outlet detects the presence of the plug (in particular, the presence of the neutral prong of the plug) and turns on the flow of power to the hot receptacle, and thereby allowing power to flow through the plug and the appliance connected thereto. Thereafter, circuitry is able to detect how much current is flowing through the appliance. When the plug is removed, the circuitry turns off the flow of power to the hot receptacle. Thus, if a person sticks an object into the hot receptacle of the outlet, that person will not receive a shock because power is not flowing to the hot receptacle.

Figure 5:
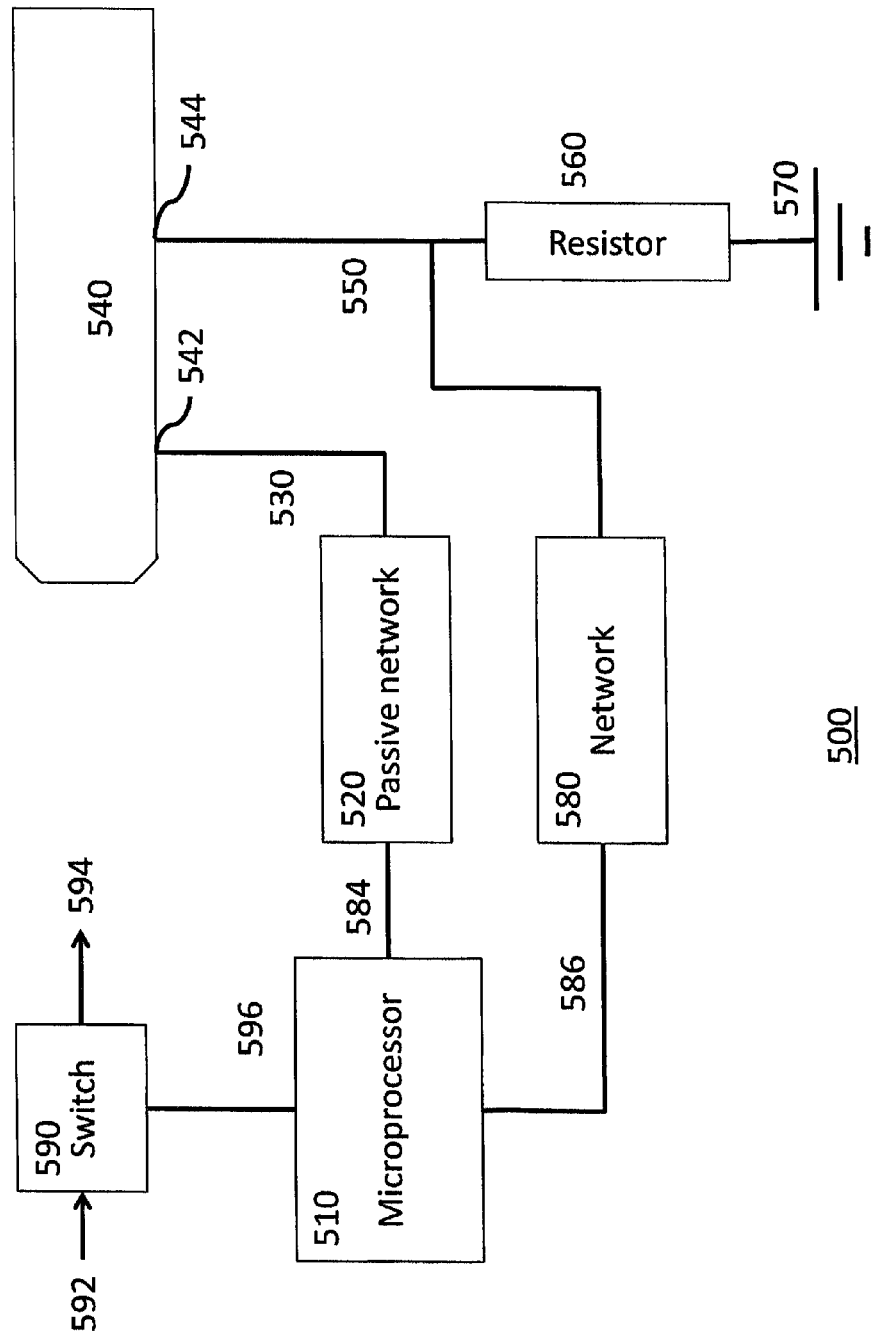
FIG. 5 schematically illustrates a portion of an electrical circuit of an outlet in accordance with an embodiment of the present disclosure.

FIG. 5 is a schematic of outlet control circuitry that controls and monitors the flow of power in an outlet 500 of an embodiment of the present disclosure. Outlet 500 includes a microprocessor 510 that controls at least some aspect of operation within the outlet 500. Microprocessor 510 may include any of the features described with respect to the microprocessor 210 of FIG. 2 and microprocessor 310 of FIG. 3. Microprocessor 510 may include a memory (not shown), as described above, or may be connected to external memory (not shown). The memory may hold software instructions, variables, and data, as is known in the art. As discussed above, a microprocessor is capable of running software or an algorithm stored in memory. Outlet 500 may also include a passive network 520, a network 580, a resistance element 560, and a switch 590. The passive network 520 in conjunction with the microprocessor 510 may be configured to detect the presence or absence of a neutral prong 540 of a plug, and also serves to protect the microprocessor 510 from any harmful currents and/or voltages. The network 580 detects how much current is flowing in an appliance that is connected to the neutral prong 540 of the plug. The resistance element 560 is used in conjunction with network 580 to allow a voltage to be read and determine the amount of current flowing in the appliance. Switch 590 controls the flow of power to a hot receptacle (not shown) of outlet 500.

FIG. 5 shows a state in which the neutral prong 540 of the plug is inserted into a receptacle of outlet 500, like the state shown in FIG. 4, which allows passive network 520 and network 580 to become "active." The outlet 500 includes one or more contacts, as described above in reference to FIGS. 4A-4F. In this embodiment of the present disclosure, the one or more contacts include first contact 542 and second contact 544.

When the neutral prong 540 is inserted into the outlet 500, a connection is made between the first contact 542 and the second contact 544 via the neutral prong 540. The microprocessor 510 after a signal is processed by passive network 520 detects the connection of the first contact 542 and the second contact 544 via neutral prong 540, and the microprocessor 510 may turn on the flow of power to the hot receptacle of the outlet 500 by sending a signal to switch 590. When the neutral prong 540 of the plug is removed from the receptacle of outlet 500, the connection between the first contact 542 and the second contact 544 is broken, and the microprocessor may turn off power to the hot receptacle of the outlet 500. The first contact 542 connects via connection 530 to the passive network 520. The passive network 520 may include a resistor, resistor divider, capacitor, inductor, and other passive electronic components, as known in the art. The passive network 520 is connected to the microprocessor 510 via connection 584. The passive network 520 may serve to protect microprocessor 510 from any parasitic voltage or current that may be present when neutral prong 540 is inserted in outlet 500. Passive network 520 also may be used to signal the microprocessor 510 that a plug is present in outlet 500 by translating the presence of the plug to a logic value that can be read by microprocessor 510. In one embodiment, the connection from the passive network 520 to microprocessor 510 is made to a port of the microprocessor 510 that may be capable of generating interrupts for the microprocessor 510, as is known in the art. The port for generating interrupts for microprocessor 510 may be by default set at a logic high or logic low. When a plug is present in outlet 500, a connection is made between first contact 542 and second contact 544, and thus, connecting connection 530 to connection 550. When the plug is present in outlet 500, passive network 520 will generate a corresponding logic value via connection 584 and signal the microprocessor 510 to generate an interrupt, which will then turn on the flow of power to the outlet 500.

In another embodiment, the connection 584 may be connected to the microprocessor 510 maybe with a port that has a pull up to a voltage that signals the microprocessor 510 to turn on the flow of power. In yet another embodiment, the passive network 520 may include a connection to a voltage supply available within the outlet 500. In an embodiment, the passive network 520 may also include diodes, transistors, op amps, logic gates or other active components.

The second contact 544 of outlet 500 connects via connection 550 to a resistance element 560. The resistance element 560 may also connect to a system ground 570. In one embodiment, the resistance element 560 may be a resistor having a resistance of, for example, 1 ohm or less. In an alternative embodiment, the resistor 560 may be replaced with a potentiometer to have a variable resistance. Thus, when a current passes through resistance element 560, a voltage can be detected at connection 550. In an alternative embodiment, resistance element 560 may be removed and the connection 550 may be connected directly to microprocessor connection 586. In an alternative embodiment, resistance element 560 may be removed and the connection 550 may be connected directly to system ground 570. In this alternative embodiment, the network 580, discussed below, may be omitted.

The second contact 544 is also connected to the network 580 via connection 550. Network 580 may include active and/or passive components, such as transistors, diodes, op amps, resistors, capacitors, inductors, logic gates, as is known in the art. The various components of network 580 may be used to buffer and condition a signal, such as a voltage, at connection 550. In one embodiment, the network 580 may convert the signal (voltage) at connection 550.

Network 580 also connects with microprocessor 510 via connection 586. In one embodiment of the present invention, network 580 connects to microprocessor 510 via an analog-to-digital ("A/D") input port. Thus, network 580 converts the signal (voltage) at connection 550 to a level that can be read by the input of the microprocessor 510. In an alternative embodiment, network 580 may function as an A/D circuit and convert an analog signal at connection 550, such as a voltage, to a digital signal. Thus, the input port of microprocessor 510 connected via connection 586 may be a standard logic input (digital input) so that a logic level will be detected if the current (or power) drawn by an appliance connected to outlet 500. The signal conveyed via connection 586 may be used to measure and/or estimate the current and/or power drawn by an appliance, such as appliance 180 discussed above, connected to the neutral prong 540 of the plug.

As shown in FIG. 5, the switch 590 connects to a source of electrical power via a connection 592, which is sometimes referred to as a hot lead. Switch 590 also may be connected to a hot receptacle (not shown) of outlet 500 via connection 594, which receives a hot prong from the plug inserted into outlet 500. When the switch 590 is open, no power flows to the hot receptacle, and thus, any appliance plugged into the receptacle receives no electrical power. When the switch 590 is closed, power can flow to the hot receptacle, and thus, any appliance plugged into the receptacle receives power. Switch 590 may be a relay or any other device known to control the flow of electrical power. Switch 590 is connected to microprocessor 510 via one or more connections 596. Circuit elements, such as transistors, resistors, capacitors, logic gates, or other elements as is known in the art, may be disposed between the one or more connections 596 and microprocessor 510 to transform the output signal from microprocessor 510 into a signal capable of controlling the switch 590.

In some embodiments, switch 590 may be instantiated by a TRIAC, or there may be a TRIAC in parallel with switch 590. In another embodiments there is a switch, a TRIAC, or a switch and a TRIAC for each receptacle in the outlet 400. As known to those in the art, a TRIAC may provide dimming functionality.

In some embodiments, prong 540 may be separated into 2 different contacts, one of which makes contact to 542, and the second of which makes contact to 544. Either or both of the contacts may thus be connected to a logic circuit outside of the outlet. The logic circuit may provide transitions that are interpreted by the microprocessor 510 and cause the microprocessor to enter a test or factory mode. The factory mode may allow the external logic to determine log information from the microprocessor, reset the state of the microprocessor, reflash software to the outlet 500, or provide other test, monitoring, and reset functions.

Figure 6:
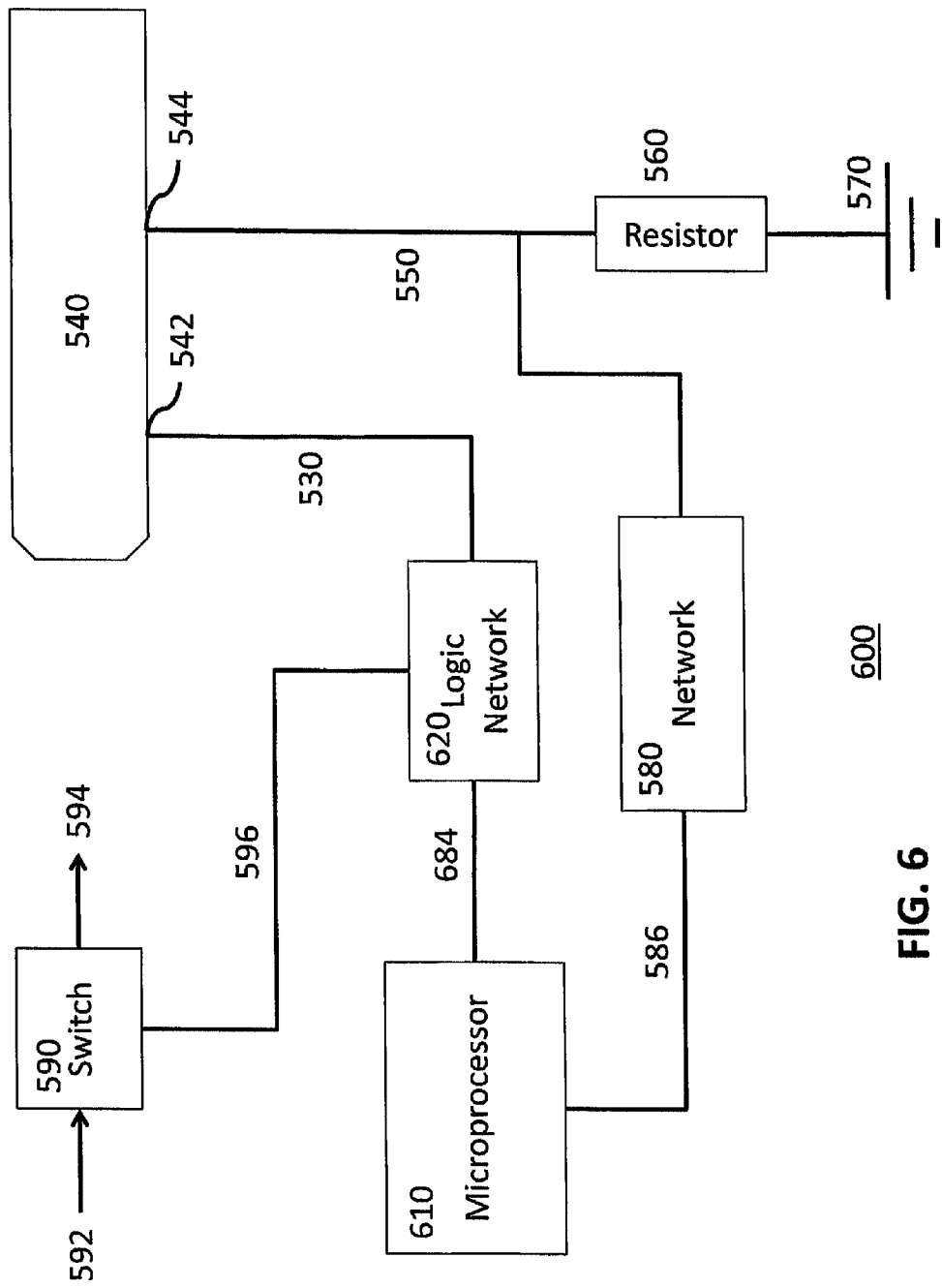
FIG. 6 schematically illustrates an alternate portion of an electrical circuit of an outlet in accordance with an embodiment of the present disclosure.

FIG. 6 is a schematic of outlet control circuitry that controls and monitors the flow of power in an outlet 600 of another embodiment of the present disclosure. In this embodiment, outlet 600 includes many of the same features as outlet 500, as discussed above, and those features are numbered the same and certain details will be omitted for sake of clarity. Outlet 600 may comprise a microprocessor 610 that includes many of the same features as microprocessor 510, logic network 620 that includes many of the same features as passive network 520, and connection 684. The differences between outlet 500 and outlet 600 are discussed in detail below.

The first contact 542 connects via connection 530 to a logic network 620. The logic network 620 may include one or more logic gates, one or more resistor(s), resistor divider(s), or other components such as capacitors, transistors, diodes, and inductors. The logic network 620 is connected to a port of the microprocessor 610 via the connection 684. In this embodiment, a logic signal may be provided to or from microprocessor 610 via connection 684.

In this embodiment, the switch 590 is controlled by one or more connections 596 to the logic network 620. The benefit of connecting the switch 590 to the logic network 620 instead of by a microprocessor is that there is no need to interrupt the microprocessor's current operations to turn on or turn off the flow of power to the hot receptacle. Instead, logic network 620 directly signals the switch 590 to turn on and turn off the flow of power.

When the neutral prong 540 is inserted into outlet 600, a connection is made between first contact 542 and second contact 544 by the neutral prong 540, and a signal on connection 530 will be pulled low because of the connection to system ground 570 via resistance element 560. The logic network 620 would function to turn on switch 590 via connection 596 if neutral prong 540 is detected (for example, by a low voltage on connection 530 and in some embodiments if the microprocessor 610 via connection 684 indicates that power should be enabled (with, for example, a logic high on signal via connection 684). In an alternative embodiment, logic network 620 may provide a logic signal to microprocessor 610 via connection 684 that a plug has been inserted into or removed from the outlet 600. If the neutral prong 540 is removed, the connection between the first contact 542 and the second contact 544 is broken and the signal provided by connection 684 may change and logic network 620 would turn off the switch 590 via connection 596. In an alternative embodiment, the microprocessor 610 may change the signal provided on connection 684 in response to a signal received at the outlet or in response to software running on the microprocessor 610. Additionally, a change of the state of logic provided on connection 684 may also result in the logic network 620 causing the switch 590 to turn off via a signal on connection 596.

In an embodiment, the outlet 600 would have a logic low (ground) provided to logic network 620 via connection 530 and a logic high provided to logic network 620 via connection 684 from microprocessor 610 to enable the switch 590. However, it would be obvious to one of ordinary skill in the art to modify the circuit to use other combinations of high and low signals to indicate that the power should be enabled or disabled.

Figure 7:
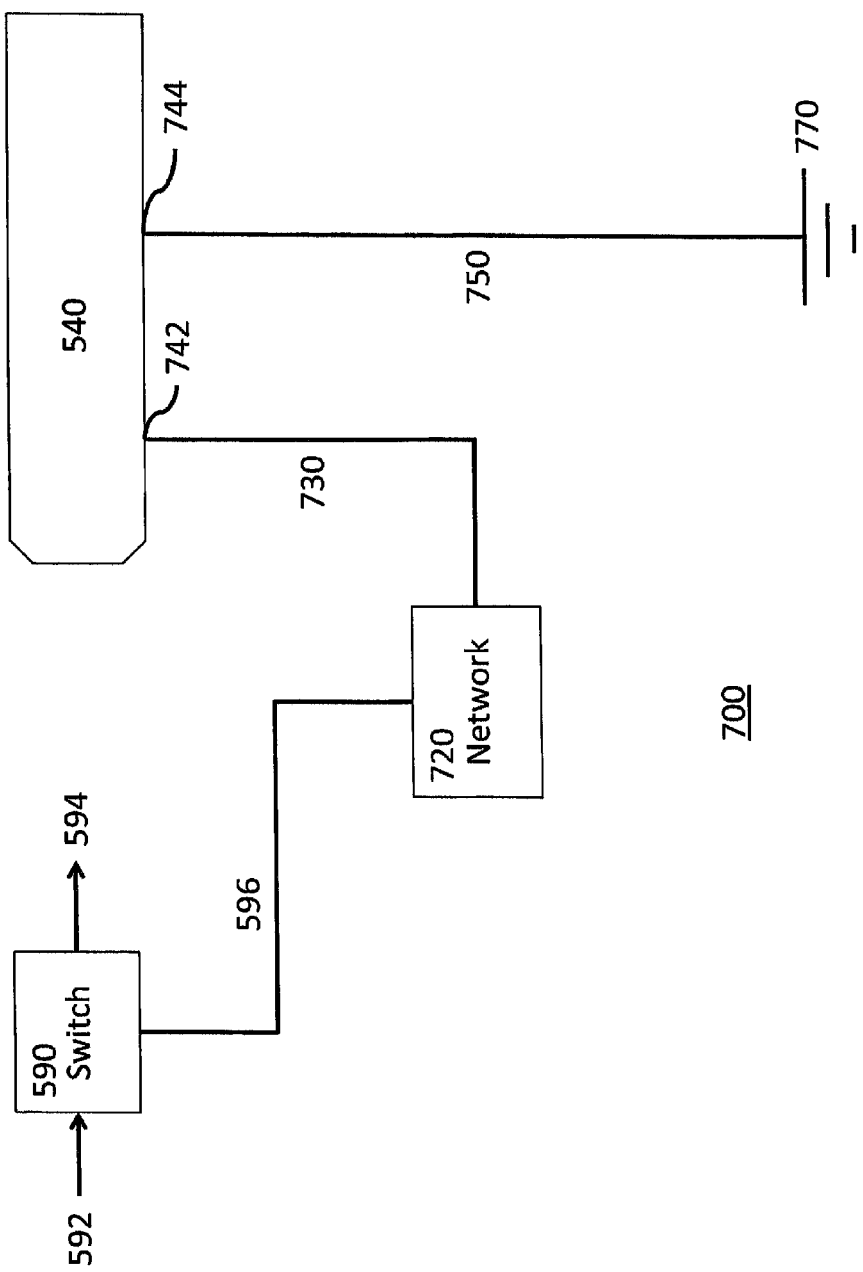
FIG. 7 schematically illustrates another alternate portion of an electrical circuit of an outlet in accordance with an embodiment of the present disclosure.

FIG. 7 is a schematic of outlet control circuitry that controls and monitors the flow of power in an outlet 700 of another embodiment of the present disclosure. In this embodiment, outlet 700 includes many of the same features as outlet 500 and outlet 600, as discussed above, and those features are numbered the same and certain details will be omitted for sake of clarity. The differences between outlet 700 and outlet 500 and outlet 600 are discussed in detail below. Outlet 700 includes a first contact 742 and a second contact 744. First contact 742 connects via connection 730 to a network 720, and second contact 744 connects via connection 750 to a system ground 770. The network 720 may include transistors, logic gates, resistor(s), resistor divider, or other components such as capacitors and inductors. In some embodiments the network 720 may include a connection to a voltage supply available within the outlet.

When the neutral prong 540 is inserted into a receptacle of outlet 700, a connection is made between first contact 742 and second contact 744 by the neutral prong 540. Once inserted, a signal is provided on connection 730 by a voltage being pulled low because connection 730 has been connected to system ground 770 via neutral prong 540 and connection 750. When the signal on connection 730 is pulled low, the network 720 provides a signal to switch 590 via connection 596 to turn on the flow of power to outlet 700. If the neutral prong 540 is removed, the connection between first contact 742 and second contact 744 is broken, the signal provided on connection 730 will change and thereby network 720 will provide a signal on connection 596 to turn off the flow of power to outlet 700.

Figure 8:
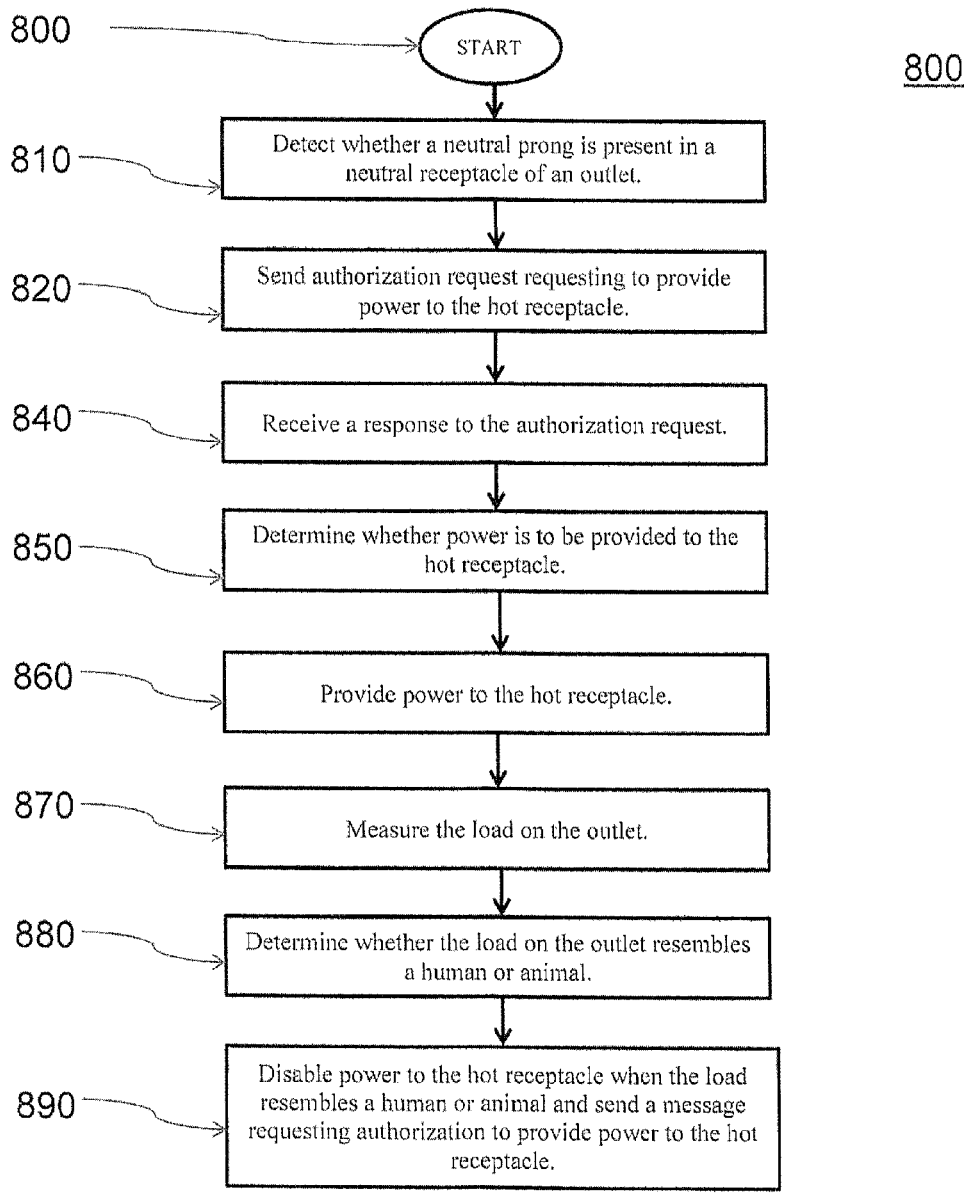
FIG. 8 depicts a flow diagram of an exemplary method for configuring a building automation system, in accordance with an embodiment of the present disclosure.

FIG. 8 is an exemplary method 800 of implementing aspects of the disclosed embodiments. The method begins at 810 with an outlet in which a plug is not present in a receptacle of the outlet, power may be disabled to the receptacle. The power to the receptacle of the outlet may continue to be disabled whenever the plug is not present.

When a plug is inserted into a receptacle, the outlet may determine that the insertion has been made at step 820. The determination may be made by one of the aforementioned outlets or by other methods as known in the art. For example, step 820 may detect the presence of a prong when the prong completes an electrical circuit that is detected by a controller or microprocessor. Alternatively, the insertion of the plug may also be determined by a mechanical switch that changes states when a prong is inserted into the outlet. The change of state of the mechanical switch may be detected by a controller or microprocessor. A proximity or optical sensor also may be used to detect when a prong is inserted into a receptacle of an outlet.

After the plug is determined to be inserted into the outlet at step 820, the controller or microprocessor may send an activation request to a known device of the building automation system 100, such as controller 110, mobile device 170, or another device connected to the building automation system 100. The authorization request of step 820 is a request for authorization to enable power to the receptacle of the outlet.

At step 840, the outlet receives a response to the authorization request. At step 850, the outlet determines whether to activate the receptacle of the outlet. If a positive response is received, and the outlet enables power to the receptacle. If a negative response is received or no response is received after a predetermined time, the outlet may generate a message that power has not been enabled to the receptacle send the message to a known device of the building automation system 100. In some embodiments, the message may be sent to a device that is in closest proximity to the outlet.

In some embodiments, the building automation system 100 may provide an audible, visual, or vibratory warning that an outlet is going to be energized prior to providing power to the receptacle. The audible warning may be provided by any component connected to building automation system 100. The outlet, such as aforementioned outlets, may include a speaker connected to the microprocessor to provide an audible warning. The audible warning may include a count down after which power is enabled. A vibratory warning may be provided by a device, such as mobile device 170, that is connected to the building automation system 100, or provided only to a device that is near the building automation system 100 or near the receptacle that is to be powered. The building automation system 100 may provide a visual indication that the outlet is disabled or enabled such as one or more LEDs on the outlet which may be connected to the aforementioned microprocessors or outlets. The LED may flash or may be illuminated to indicate the status of the outlet, such as, the LED may flash at a first rate to indicate power is going to turn on, and may flash at a second rate to indicate power is on. One of the rates could be constant illumination.

In some embodiments the power will be turned on with a delay after the neutral prong is inserted. The delay may be about 2 seconds to about 5 seconds, or another time period. The delay would permit the plug to be completely seated in the outlet prior to enabling power to reduce the possibility of arcing as the plug is inserted. In some embodiments, a contact such as 542 may be positioned so that the neutral prong 540 makes a connection to the contact only when the prong is completely or nearly completely inserted into the outlet. Such a positioning may also enable the outlet to detect that the prong 540 has been partially removed from the outlet and power to the receptacle can be disabled.

At step 860, power to the receptacle is enabled. The enabling of the receptacle may occur by a ramp or slow start. Voltage to the receptacle may be ramped up over a period of time such, for example, a second, or several seconds. If a person is touching metal connected to the outlet, they may receive an uncomfortable shock as the voltage ramps up that would desirably result in the person releasing their grip on the metal, breaking the circuit to the person. A goal would be to provide voltage to the receptacle to incent a person to remove themselves from a dangerous situation before providing sufficient voltage to cause muscle contraction that may prevent a person from letting go and breaking a connection between themselves and the outlet. A ramp or slow start may be facilitated by a TRIAC or other device as is known in the art.

At step 870, the outlet would measure the load on the outlet by measuring the voltage and current waveforms using power monitor circuitry, such as power monitor 340.

At step 880, the outlet determines whether the load on the outlet resembles a human, such as resistance <1500 Ohms. If the outlet does not determine the load on the outlet resembles a human or animal, then method may to proceed to step 870 to continuously monitor the load or the method may end. If the outlet determines the load is a human or animal, then the method proceeds to step 890. At step 890, power to the receptacle is disabled and a message may be sent to the known device as described in step 830. The message may request an additional authorization request to provide power to the receptacle, and the method may then proceed to step 840 to await a response. If an affirmative response is received, then power is enabled as discussed above. If a negative response is received or no response is received after a predetermined time, the outlet may generate a message that power has not been enabled to the receptacle and send the message to the known device of the building automation system 100. In some embodiments, the message may be sent to a device that is in closest proximity to the outlet.

Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

It is understood that the present disclosure is not limited to the particular forms, embodiments, and/or examples illustrated. Alternatives and/or modifications of the systems, devices, and methods disclosed herein are contemplated and may be made without departing from the spirit and scope of the disclosure. Further, elements of any embodiment may be added and/or combined with any elements of another embodiment.

Embodiments of the present disclosure may be used in connection with any structure, including, but not limited to, homes, offices, businesses, schools, churches, sporting complexes, hospitals, shopping centers, and manufacturing facilities. In addition, at least certain aspects of the aforementioned embodiments may be combined with other aspects of the embodiments, or removed, without departing from the scope of the disclosure.

Other embodiments of the present disclosure will be apparent to those skilled in the art from consideration of the specification and practice of the embodiments disclosed herein. It is intended that the specification and examples be considered as exemplary only, with a true scope and spirit of the disclosure being indicated by the following claims.

We claim:

1. An apparatus capable of detecting the presence of a plug, said apparatus comprising:
   a plurality of receptacles configured to receive a plurality of prongs from a plug, wherein said plurality of receptacles includes a hot receptacle having a hot contact and a neutral receptacle having a first neutral contact and a second neutral contact, wherein said second neutral contact is connected to a system ground;
   a switch including a connection to a power source and a connection to said hot contact, wherein said connection to the power source is connected to said connection to said hot contact when said switch is turned on, and wherein said connection to the power source is disconnected from said connection to said hot contact when said switch is turned off; and
   a microprocessor configured to turn on and turn off said switch, wherein said microprocessor is connected to said first neutral contact and said switch, and wherein said microprocessor is connected to the system ground when a neutral prong of the plurality of prongs from the plug is present in said neutral receptacle,
   wherein said microprocessor turns on said switch when the neutral prong is present in said neutral receptacle, the neutral prong connecting the first neutral contact and the second neutral contact, and
   wherein said microprocessor turns off said switch when the neutral prong is not present in said neutral receptacle.

2. The apparatus according to claim 1, wherein said microprocessor causes software to be executed, said software instructing said switch to turn on when the neutral prong is present in said neutral receptacle, and the neutral prong electrically coupling the first neutral contact and the second neutral contact, and said software instructing said switch to turn off when the neutral prong is not present in said neutral receptacle.

3. The apparatus according to claim 2, wherein said software requests authorization to provide power to said hot contact before instructing said switch to turn on.

4. The apparatus according to claim 3, wherein said software receives a response to the request for authorization to provide power to said hot contact before instructing said switch to turn on.

5. The apparatus according to claim 3, wherein said request for authorization to provide power to said hot contact is sent to a device closest to the apparatus.

6. The apparatus according to claim 1, wherein said plurality of said receptacles further includes a ground receptacle.

7. The apparatus according to claim 1, further comprising:
   a passive network, wherein said passive network provides a signal to said microprocessor when the neutral prong is present in said neutral receptacle.

8. The apparatus according to claim 7, wherein said passive network includes passive electronic components that protect said microprocessor from at least one of undesirable currents and undesirable voltages.

9. The apparatus according to claim 1, further comprising:
   a network, wherein said network detects at least one of current, voltage, and power used by a device connected to the plug.

10. The apparatus according to claim 9, wherein, when said network detects the at least one of current, voltage, and power used by the device connected to the plug, said network provides a usage signal to said microprocessor, and
    wherein said microprocessor monitors the usage signal.

11. A method of providing power to a receptacle of an outlet, the method comprising:
    detecting whether a neutral prong of a plug is present in a first receptacle of an outlet;
    sending an authorization request to provide power to a second receptacle of the outlet when said detecting step detects that a neutral prong is present in the first receptacle of the outlet;
    receiving a response to the authorization request; and
    determining whether to provide power to the second receptacle of the outlet based on the response to the authorization request.

12. The method according to claim 11, further comprising:
    providing power to the second receptacle of the outlet based on the determination in said determination step.

13. The method according to claim 12, wherein, when providing power to the second receptacle of the outlet, power is increased up to full power over a predetermined time period.

14. The method according to claim 13, wherein the predetermined time period is at least 2 seconds.

15. The method according to claim 11, wherein said step of sending the authorization request includes sending a request to an authorized user to request permission to provide power to another receptacle of the outlet.

16. The method according to claim 11, further comprising:
    determining whether a load on the first receptacle of the outlet resembles a human, wherein when the load is determined to resemble a human, power to the second receptacle is disabled.

17. The method according to claim 16, further comprising: sending a message when the load is determined to resemble a human.

18. The method according to claim 17, wherein the message sent is a second authorization request requesting to restore power to the second receptacle of the outlet.

19. The method according to claim 18, further comprising:
    receiving a response to the second authorization request to restore power to the second receptacle of the outlet; and
    determining whether to restore power to the second receptacle of the outlet based on the response to the second authorization request.

20. The method according to claim 19, further comprising: restoring power to the second receptacle of the outlet based on the determination in said second determination step.

* * * * *